(12) United States Patent
Graf et al.

(10) Patent No.: US 9,302,637 B2
(45) Date of Patent: Apr. 5, 2016

(54) VEHICLE VOLTAGE SUPPLY

(71) Applicant: Infineon Technologies AG, Neubiberg (DE)

(72) Inventors: Alfons Graf, Kaufering (DE); Wolfgang Troeger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 428 days.

(21) Appl. No.: 13/957,291

(22) Filed: Aug. 1, 2013

(65) Prior Publication Data

US 2014/0035359 A1    Feb. 6, 2014

(30) Foreign Application Priority Data

Aug. 2, 2012   (DE) .......................... 10 2012 015 322

(51) Int. Cl.
*B60L 1/00*    (2006.01)
*B60L 3/00*    (2006.01)
*B60R 16/033*  (2006.01)

(52) U.S. Cl.
CPC .................................. *B60R 16/033* (2013.01)

(58) Field of Classification Search
CPC ..................................................... B60R 16/033
USPC ............................................ 307/9.1, 116, 117
See application file for complete search history.

(56) References Cited

U.S. PATENT DOCUMENTS

2013/0250460 A1*   9/2013   Grozinger ............... G01F 15/06
                                                       361/54

FOREIGN PATENT DOCUMENTS

| DE | 10361641 A1    | 10/2004 |            |
|----|----------------|---------|------------|
| DE | 102010040833 A1 | 3/2012  |            |
| GB | 2396982 A      | * 7/2004 | H02H 3/023 |

* cited by examiner

*Primary Examiner* — Hal Kaplan
(74) *Attorney, Agent, or Firm* — Shumaker & Sieffert, P.A.

(57) ABSTRACT

One embodiment provides a vehicle voltage supply having a vehicle battery, a load with two voltage supply connections, a fuse in a path between the vehicle battery and one of the voltage supply connections of the load, and a clamping circuit transistor. The clamping circuit transistor can be switched in such a manner that the clamping circuit transistor produces a short circuit between voltage supply connections of the load in order to activate the fuse. An energy store is set up to store the energy needed to drive the clamping circuit transistor when producing the short circuit, and a charging circuit is set up to charge the energy store at least during the time in which the clamping circuit transistor does not produce a short circuit.

17 Claims, 5 Drawing Sheets

VEHICLE VOLTAGE SUPPLY

FIELD OF THE INVENTION

The application relates to a vehicle voltage supply.

BACKGROUND OF THE INVENTION

The electronics of motor vehicles are usually supplied with the aid of a vehicle battery which provides a DC voltage of 12 V, 24 V or 48 V. The supply lines from electrical loads are generally protected using fuses close to the battery. A distinction can be made between two types: switched supply lines and non-switched supply lines. The switched supply lines are disconnected, for example using a switch between the fuse and the supply line, when the vehicle is parked. Non-switched supply lines are always connected to the battery via a fuse.

There is a potential safety problem, especially in the case of loads with a non-switched voltage supply. This safety problem lies in the fact that, in an electronic control unit (ECU), various fault mechanisms may result in an uncontrolled current flow in the control unit, but without tripping the fuse. Such an uncontrolled current flow may consequently cause a severe temperature increase which, in the extreme case, may result in a fire in the control unit and even in a fire in the vehicle.

Due to the concept, the uncontrolled current flow cannot be disconnected in a non-switched supply even if the fault were detected by electronics. The disconnection function could fundamentally be performed with an upstream fuse. However, if the uncontrolled current flow is not large enough to trip the fuse, the uncontrolled current flow may result in damage despite the presence of the fuse.

SUMMARY

One embodiment provides a vehicle voltage supply having a vehicle battery, two voltage supply connections for a load, a fuse in a path between the vehicle battery and one of the voltage supply connections of the load, and a clamping circuit transistor. The clamping circuit transistor can be switched in such a manner that the clamping circuit transistor produces a current path between voltage supply connections of the load in order to activate the fuse. An energy store is set up to store the energy needed to control the clamping circuit transistor when producing the current path, and a charging circuit is set up to charge the energy store at least during the time in which the clamping circuit transistor does not produce a current path.

DETAILED DESCRIPTION OF THE DRAWINGS

The detailed description is presented with reference to the accompanying figures. The use of the same reference symbols in different figures indicates similar or identical elements or function blocks.

Figure 1:
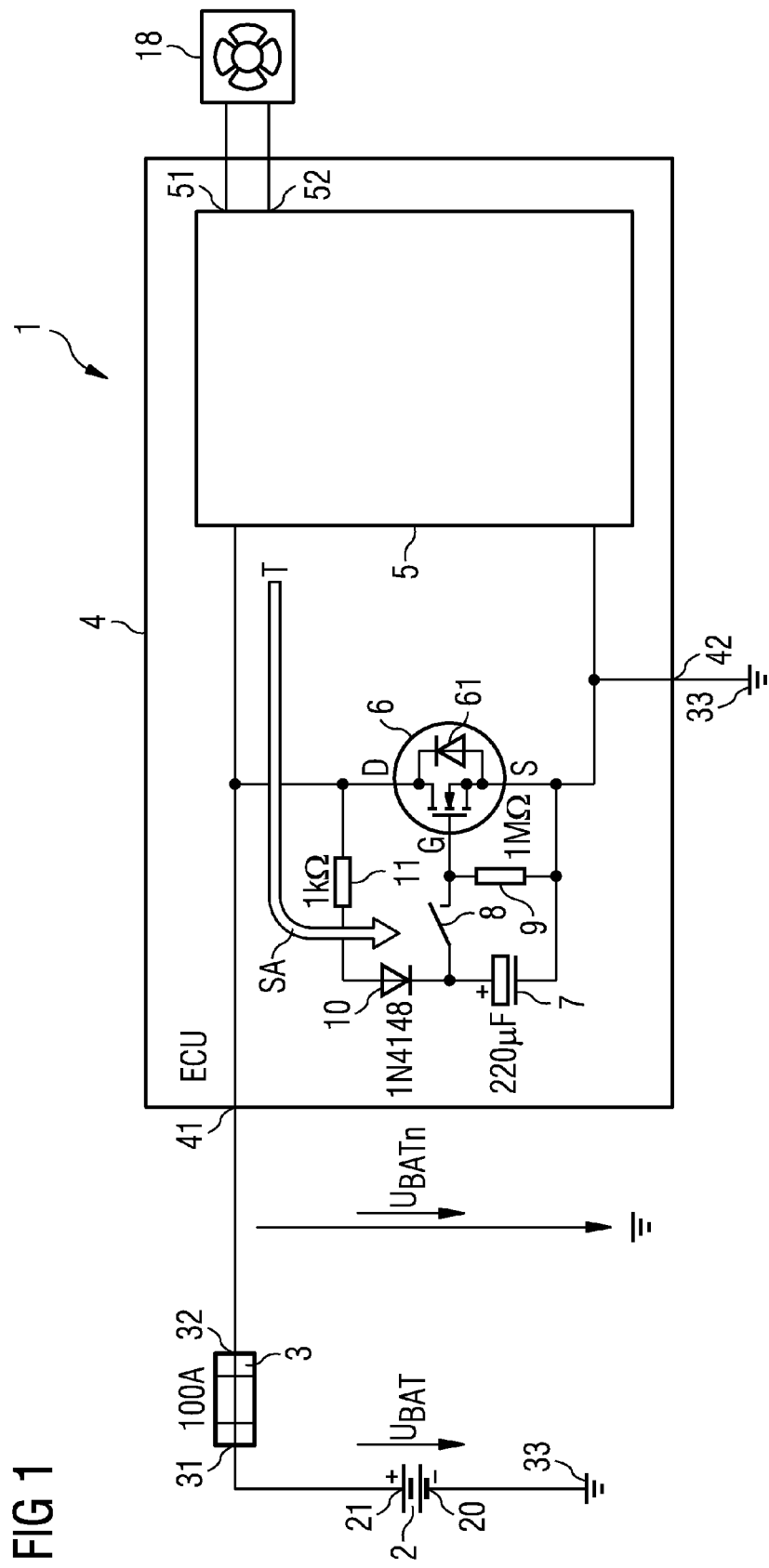
FIG. 1 shows a basic circuit diagram of an electrical circuit for fuse disconnection in a control unit according to one embodiment.

FIG. 1 shows an embodiment of fuse disconnection using the example of a radiator fan application in a motor vehicle.

The apparatus 1 shown in FIG. 1 shows a battery 2, a fuse 3 in the form of a fusible link, a radiator fan 18 and an ECU (Electronic Control Unit) 4 which controls the radiator fan 18. The battery 2 has two connections 20 and 21 at which the battery 2 provides a DC voltage UBAT of 12 V, and of 24 V or 48 V in other embodiments. The first connection 20 of the battery 2 is connected to earth 33, while the second connection 21 is connected to a first connection 31 of the fuse 3. The second connection 32 of the fuse 3 is connected to a first voltage supply connection 41 of the ECU 4, the second voltage supply connection 42 of which is connected to earth 33. The ECU 4 therefore receives, at its voltage supply connections 41 and 42, a supply voltage of Ubatn which is applied between the second connection 32 of the fuse 3 and earth 33 and is approximately as large as the battery voltage UBAT. The fuse 3 is therefore in a path between a voltage supply connection 41 of the load, here the ECU 4, and a connection 21 of the battery 2. The number of voltage supply connections is not restricted to two. There are also control units with more voltage supply connections.

The ECU 4 contains the two voltage supply connections 41 and 42, fan electronics 5, a transistor 6, a storage capacitor 7, a trigger switch 8, a switch-off resistor 9, a diode 10 and a charging resistor 11 and two output connections 51 and 52 via which the fan electronics drive the radiator fan 18.

The transistor 6 is in the form of an n-channel MOS field effect transistor which contains an integrated inverse diode 61. The drain of the transistor 6 is connected to the first voltage supply connection 41 and the source of the transistor 6 is connected to the second voltage supply connection 42. The inverse diode 61 is connected in parallel with the source-drain path, which can also be referred to as the load path, and its anode is therefore connected to the second voltage supply connection 42.

The resistor 11 has a value of 1 kOhm and is provided between the first voltage supply connection 41 and the anode of the diode 10. The cathode of the diode 10 is connected to a first electrode of the capacitor 7, the second electrode of which is connected to the second voltage supply connection 42. The load path of the switch 8 is provided between the first electrode of the capacitor 7 and the gate of the transistor 6. The resistor 9 is provided between the gate of the transistor 6 and the second voltage supply connection 42.

The switch 8 is open during normal operation. As a result, current flows through the resistor 11 and the diode 10 into the capacitor 7 which is therefore charged until the voltage applied across the capacitor is equal to the voltage Ubatn minus the threshold voltage of the diode 10. That means that the capacitor 7 is supplied by the battery 2. Owing to the resistor 9, the gate-source voltage of the transistor 6 is equal to zero, as a result of which the transistor 6 is off. The resistor 9 forms a bias circuit for controlling the potential of the control connection of the clamping circuit transistor during the time in which the clamping circuit transistor does not produce a short circuit.

As an alternative to the capacitor 7, the control energy may also be stored in a so-called supercapacitor or in a battery or in a rechargeable battery together with charging electronics. Alternatively, a charge pump may also be fitted to the energy store in order to provide a sufficient control voltage, which is greater than the threshold voltage, for the transistor 6 for as long as possible even when the storage voltage is dropping.

In the event of a disturbance, the transistor 6 is switched on via a fuse disconnection signal. However, this is not an electrical signal but rather a temperature signal in the embodiment shown. The switch 8 is in the form of a temperature-controlled switch, for example in the form of a bimetal switch. This switch 8 is provided in the ECU 4 in such a manner that an excessively high temperature in the ECU 4, for example if the temperature there exceeds the predetermined value of 180° C., causes the switch 8 to close. Further typical predetermined values for the temperature are between 150 and 250° C. The temperature sensor may be provided, for example, in the vicinity of the clamping circuit transistor 6 or in the fan electronics 5 or on the power transistors of the fan electronics 5.

After the switch 8 has been turned on, the voltage of the capacitor 7 is applied across the gate-source path of the transistor 6, as a result of which the transistor 6 turns on. This causes a high current flow through the load path of the transistor 6; in other words, a short circuit or a current path is produced between the voltage supply connections. Since this high current flows through the fuse 3, the latter is caused to fuse, as a result of which the voltage supply of the ECU 4 is disconnected. Triggering the fuse disconnection with the turning-on of the transistor 6 produces a defined short circuit between Ubatn and vehicle earth, which short circuit trips the fuse 3. The level of the short-circuit current is substantially determined by the cable and contact resistances, the battery internal resistance, the MOSFET resistance of the transistor 6 and the battery voltage. Typical currents are in the range of 200-600 A, depending on the battery voltage.

Depending on the current flow through the transistor 6, the disconnection process may last for a few 100 milliseconds but also for several seconds. The capacitor 7 is slowly discharged via the resistor 9 until the voltage across the capacitor 7 becomes zero. The resistor 9 and the capacitor 7 are dimensioned in such a manner that the transistor 6 remains reliably switched on during this disconnection time. Disconnection time is understood as meaning the time from the closing of the switch 8 to the tripping of the fuse 3. The tripping time may be in the range of 100 ms to 10 seconds, depending on the embodiment and environmental conditions.

The transistor 6 therefore forms a clamping circuit transistor which can be switched in such a manner that a short circuit can be produced between the voltage supply connections 41 and 42. Clamping circuits are generally also referred to as "crowbars". The capacitor 7 forms an energy store which stores the energy, here in the form of electrical charges, which is needed to switch on the transistor 6. The resistor 11 and the diode 10 are connected in series and therefore form a charging circuit through which the current for charging the capacitor 7 flows. This current flows, in particular, during the time in which the transistor is not turned on. It is not important for this embodiment whether the charging current for the capacitor 7 also flows through the charging circuit when the transistor 6 is on. The diode 10 ensures that current does not flow from the capacitor 7 back to the voltage supply connection 41, which would threaten to happen if the potential at the voltage supply connection 41 were to drop. However, the charges stored in the capacitor are intended to be available in order to switch on the clamping circuit transistor 6.

In one embodiment, the clamping circuit transistor is designed in such a manner that it must provide the high current for producing the short circuit only once during its service life. If the clamping circuit transistor was active once and therefore tripped the fuse, it should be replaced. In this embodiment, it is possible to use a transistor which costs relatively little and requires little space.

In this embodiment, the energy store does not require a separate auxiliary voltage since the charges are provided from the vehicle battery. This proves to be energy-efficient since additional converters for auxiliary voltages are less energy-efficient than direct charging from the vehicle battery. It goes without saying that the current can flow through a plurality of components, for example resistors, switches and fuses, even during direct charging.

In the case just described, the tripping signal SA results from the temperature increase in the ECU 4 with the physical effect on a thermostatic switch 8.

As soon as a short circuit is produced at the voltage supply connections 41 and 42, the supply voltage Ubatn in the ECU 4, and even in the entire vehicle in the case of a poor battery, drops to virtually 0 V. As a result, there could be the risk of the control of the transistor 6 no longer being supplied and therefore being disrupted. This is critical, in particular, in automotive applications since, in the latter, in contrast to many industrial applications, no independent auxiliary voltage which ensures the supply is generally available. In the embodiment shown in FIG. 1, the transistor 6 is controlled in a sufficiently stable and reliable manner even when the supply voltage Ubatn drops since the energy needed to control the transistor 6 in such a manner that it triggers the short circuit is stored in the capacitor 7. This energy is stored in the energy store during normal operation, that is to say when no short circuit is triggered. The energy is therefore available when it is needed to control the transistor in an emergency, in this case when the temperature is too high.

Figure 2:
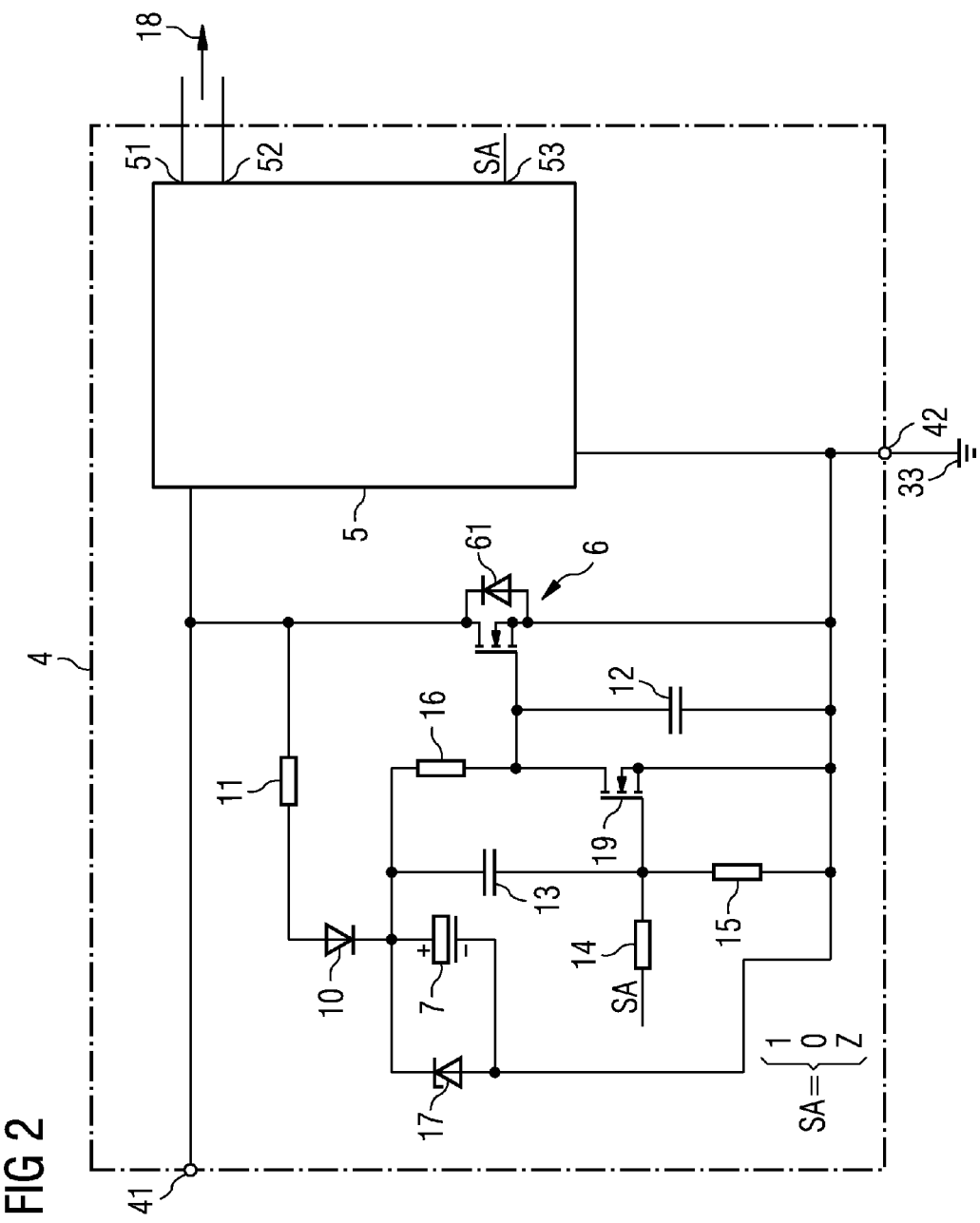
FIG. 2 shows a basic circuit diagram of fuse disconnection by means of a short-circuit switch in a control unit according to another embodiment.

FIG. 2 shows a section from an exemplary embodiment in which the short circuit is deliberately triggered by means of an electronic signal.

The ECU 4 contains the two voltage supply connections 41 and 42, fan electronics 5, a transistor 6, a capacitor 7, a resistor 11, a capacitor 13, a resistor 15, a resistor 16, a zener diode 17, a transistor 19 and a capacitor 12, a diode 10 and a charging resistor 11 and two output connections 51 and 52.

The resistor 11 has a value of 1 kOhm and is provided between the first voltage supply connection 41 and the anode of the diode 10. The cathode of the diode 10 is connected to a first electrode of the capacitor 7, the second electrode of which is connected to the second voltage supply connection 42. Hence the capacitor 7 is loaded by the voltage supply. The resistor 16 is provided between the first electrode of the capacitor 7 and the gate of the transistor 6. The transistor 19 is an re-channel field effect transistor, the source of which is connected to the second voltage supply connection 42 and the drain of which is connected to the gate of the transistor 6. The resistor 15 is provided between the gate of the transistor 19 and the second voltage supply connection 42. The capacitor 13 is provided between the cathode of the diode 10 and the gate of the transistor 19. The cathode of the zener diode 17 is connected to the cathode of the diode 10 and the anode of the zener diode is connected to the voltage supply connection 42. The capacitor 12 is provided between the gate of the transistor 6 and the second voltage supply connection 42. The resistor 14 is provided between an output 53 of the fan electronics 5 and the gate of the transistor 19. The fan electronics 5 drive the electrical signal SA via this output 53.

The fuse disconnection signal SA has the logic level 1 in the normal state. A potential which depends on the divider ratio of the resistance values of the resistors 15 and 14 therefore prevails at the gate of transistor 19. These resistors are dimensioned in such a manner that the transistor 19 is switched on as long as SA has the level 1. Consequently, a gate-source voltage of 0 V prevails at the gate of transistor 6, as a result of which the transistor 6 is switched off.

In the meantime, the capacitor 7 is charged via the resistor 11 and the diode 10.

The zener diode 17 limits the voltage across the capacitor 7 to a maximum of 20 V, for example, and therefore protects the capacitor 7 and the transistor 6 from overvoltages. Normally, current permanently flows through the resistors 16 and 11; they define a nominal operating current which always flows when the battery voltage Vbatt is applied. The resistor 16 must be large enough, in comparison with the resistor 11, so that the voltage across the capacitor 7 can become large enough.

The apparatus is intended to protect against excessive uncontrolled current flow through the ECU 4. The causes of the uncontrolled current flow may be metal filings, whisker formation, soiling or moisture. It is also possible for printed circuit boards to become conductive in an undesirable manner, for insulations to become defective or for electromigration to trigger malfunctions. Defective components, such as capacitors or MOSFETs, may also be the trigger for an excessive current flow. The excessive current flow may first of all result in an excessive temperature and consequently in the ECU 4 catching fire, in particular if the ECU 4 has a plastic housing. The situation in which the vehicle battery is no longer fully charged and its voltage has dropped from 12 V to 9 V, for example, has proved to be particularly critical. With voltages of less than 12 V, the tripping of the fuse by the switch 6 is critical, in particular, when the ECU has already been damaged or has an excessive temperature. With a lower voltage, sufficient current to trip the fuse possibly does not flow and it takes a very long time under certain circumstances.

In the event of disconnection, the level of the signal SA, which is driven by the fan electronics 5, becomes equal to 0 or has a high impedance Z. Level 0 means that the fan electronics actively drive a potential of zero volts with respect to earth 33; at level 1, the fan electronics drive a high potential which is, for example, as high as the potential at the voltage supply connection 41. At a level with a high impedance Z, the fan electronics 5 do not drive the signal SA. On account of the resistors 15 and 14, a potential of 0 V is established in the signal SA.

In this embodiment, level 0 or the level with a high impedance Z is a necessary and sufficient criterion for an excessive temperature and the causally uncontrolled fault current. If the signal with level 0 or with the level having a high impedance Z is controlled by the fan electronics 5, the potential at the gate of the transistor 19 becomes 0 V, as a result of which the transistor 19 is switched off. Consequently, the voltage stored in the capacitor is applied to the gate of the transistor 6. The transistor 6 therefore turns on completely, as a result of which the current through the fuse 3 increases, which fuse then fuses and thus disconnects the current flow.

In this embodiment, the capacitor 7 is discharged only by leakage currents, with the result that the capacitor voltage across the capacitor 7 will remain above the threshold voltage of the transistor 6 for a very long time. Therefore, the transistor 6 also remains switched on for a very long time even if Vbatt became virtually zero a long time ago as a result of the short circuit produced.

The capacitors 12 and 13 can be used to influence the switching behaviour, especially the behaviour when connecting and disconnecting the battery voltage Vbatt. In this case, the turning-on of the transistor 6 must be reliably prevented, naturally also when defined interference pulses occur.

The fuse disconnection signal SA may be generated in different ways. In one embodiment, the signal SA is switched to a low level in the case of an excessive temperature which is detected using one or more temperature sensors in the control unit and is evaluated with the aid of a Schmitt trigger level. The switching of the SA signal to a low level is also referred to as activation of the SA signal below.

In another embodiment, different temperature thresholds in the driving state and in the parked state are taken into account during evaluation. The temperature thresholds may additionally be made dependent on the instantaneous ambient temperature.

In an alternative embodiment, the SA signal falls to a low level in the case of an excessively fast temperature increase even if the maximum temperature has not yet been exceeded. This means that the change in temperature per unit time rather than the absolute temperature decides on the activation of the SA signal.

In an alternative embodiment, the SA signal is activated if the functionality of the control unit has not been fulfilled. A lack of functionality results, for example, from the fact that the fan motor is not running or is not running at the desired speed.

In a further embodiment, the SA signal is activated if the current consumption does not match the instantaneous function of the control unit, for example 80 A instead of 40 A during normal operation, or 0.5 A instead of 50 µA in the parked state of rest.

Other malfunctions which result in the activation of the SA signal may be as follows:
  MOSFETs for controlling the fan motor exhibit abnormalities, for example their gate voltages are not correctly applied.
  The watchdog function of the microcontroller has responded.
  Conductivity monitoring of printed circuit boards indicates faults.
  Leakage currents have been detected in defective or hot components, for example semiconductors.
  Smoke, light or an arc has been detected.

It is not only possible for individual indications of the cited indications of faults to result in activation of the SA signal. The activation of the SA signal may also be based on evaluation of a combination of the cited indications or further indications or their temporal sequence.

Generally, a lack of functionality of the load can trigger the clamping circuit transistor. In one embodiment, the load has a transistor with a control connection. This control connection is operated with control potentials of 0 and 12 V during normal operation, for example. In the event of a control connection breakdown, the control potential is in an intermediate range, for example at 2 V. The potential at the control connection is measured and the signal SA is activated if the potential is within a predetermined range, for example between 1 and 8 V in this case.

The transistor 6 has the parasitic inverse diode 61, likewise with a high current-carrying capacity. If the polarity of Vbatt is reversed, this acts like a short circuit and likewise ensures that the fuse is tripped. This also protects the other electronics in the control unit since their polarity reversal voltage is limited to approximately −0.7 V by the diode 61 and is applied only during the short fuse switch-off time.

In one embodiment, in the event of polarity reversal, the transistor 6 is switched on by means of a suitable control circuit parallel to the diode. This reduces the switching voltage across the transistor 6 and the inverse diode to virtually –0 V, which results in a lower thermal load and more favourable design of the transistor.

In comparison with a solution with additional relays or semiconductor switches, which are provided between the fuse and the voltage supply connection of the fan electronics 5 and disconnect the supply of the fan electronics 5 from the battery when switching off the vehicle or after a certain follow-up time after switching off the vehicle, the presented solution results in lower costs. This is the case, in particular, when the additional relays or the additional switches, in particular, must be designed for a continuous current of approximately 80 A, as in the radiator fan. In addition, a power loss is dropped across an additional relay or semiconductor switch since the current for supplying the load flows through the relay or the semiconductor switch.

In embodiments shown, the existing fuse 3 is deliberately tripped and is used as a one-off emergency disconnection. For this purpose, the voltage supply downstream of the fuse, optimally even directly in the control unit (ECU) itself, is deliberately short-circuited, as a result of which the uncontrolled current flow is artificially increased to a value which trips the fuse after a short tripping time—depending on the fuse and the impedances of the battery, cable harness and so on—and thus completely interrupts the uncontrolled current flow.

The transistor may be in the form of an N-channel MOSFET, a P-channel MOSFET or a bipolar transistor. MOSFETs are generally used for low battery voltages, for example up to 48 V, since they provide a high current flow and the gate current is virtually zero at the same time. IGBTs (Isolated Gate Bipolar Transistors) are also used in hybrid vehicles with a battery voltage of 400 V.

The transistor 6 may be an individual transistor or may be designed as a parallel or series circuit of transistors.

The transistor 6 is controlled in such a manner that the application or disconnection of the battery voltage does not result in activation of the transistor 6.

In terms of the current-carrying capacity and the thermal load, the transistor 6 is designed in such a manner that the fuse is always tripped first before another component is damaged, especially also when the battery voltage and therefore also the short-circuit current fall and the tripping time is very long.

The transistor 6 is designed in such a manner that a fuse can be disconnected at least once or several times.

In further embodiments, the ECU 4 may be a different ECU, for example an ECU for an automatic door closing system. In particular, the apparatus is suitable for non-switched supply lines since the latter usually lack a switch between the fuse and a voltage supply input of the load.

In the exemplary embodiments shown in figures, the transistor 6 is provided inside the ECU 4, that is to say in a common housing. When installing the ECU 4 in the vehicle, the fuse disconnection means is therefore concomitantly installed at the same time. In other embodiments, however, the transistor 6 may also be provided outside the ECU 4.

In further embodiments, a different type of overcurrent protection apparatus, for example an electronic fuse, may be used instead of a fusible link.

Figure 3:
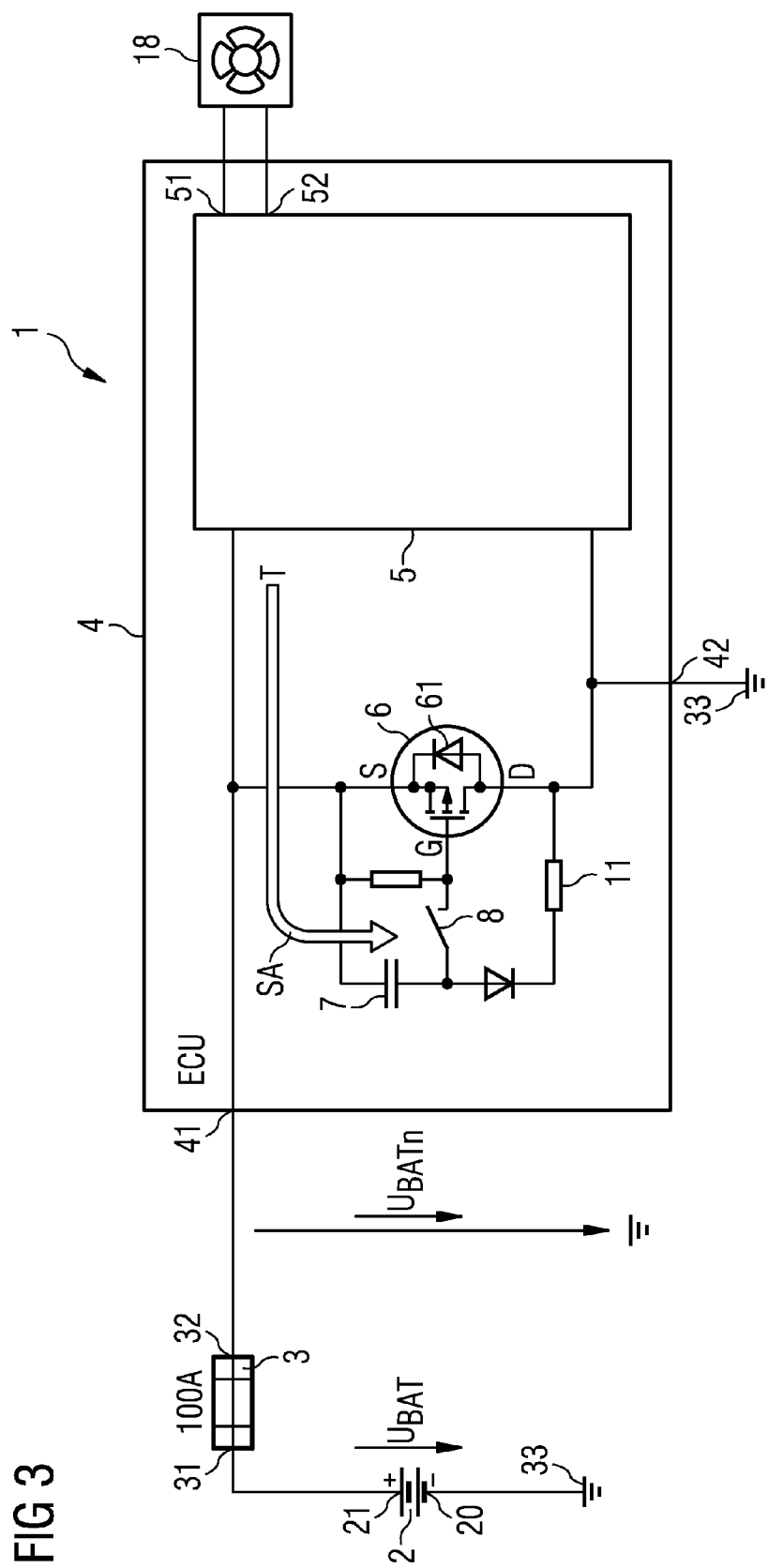
FIG. 3 shows a basic circuit diagram of fuse disconnection by means of a short-circuit switch in a control unit according to another embodiment with a p-channel MOSFET as the clamping circuit transistor.

FIG. 3 shows a basic circuit diagram of fuse disconnection by means of a short-circuit switch in a control unit according to another embodiment with a p-channel MOSFET as the clamping circuit transistor, as a result of which the polarity is reversed.

Figure 4:
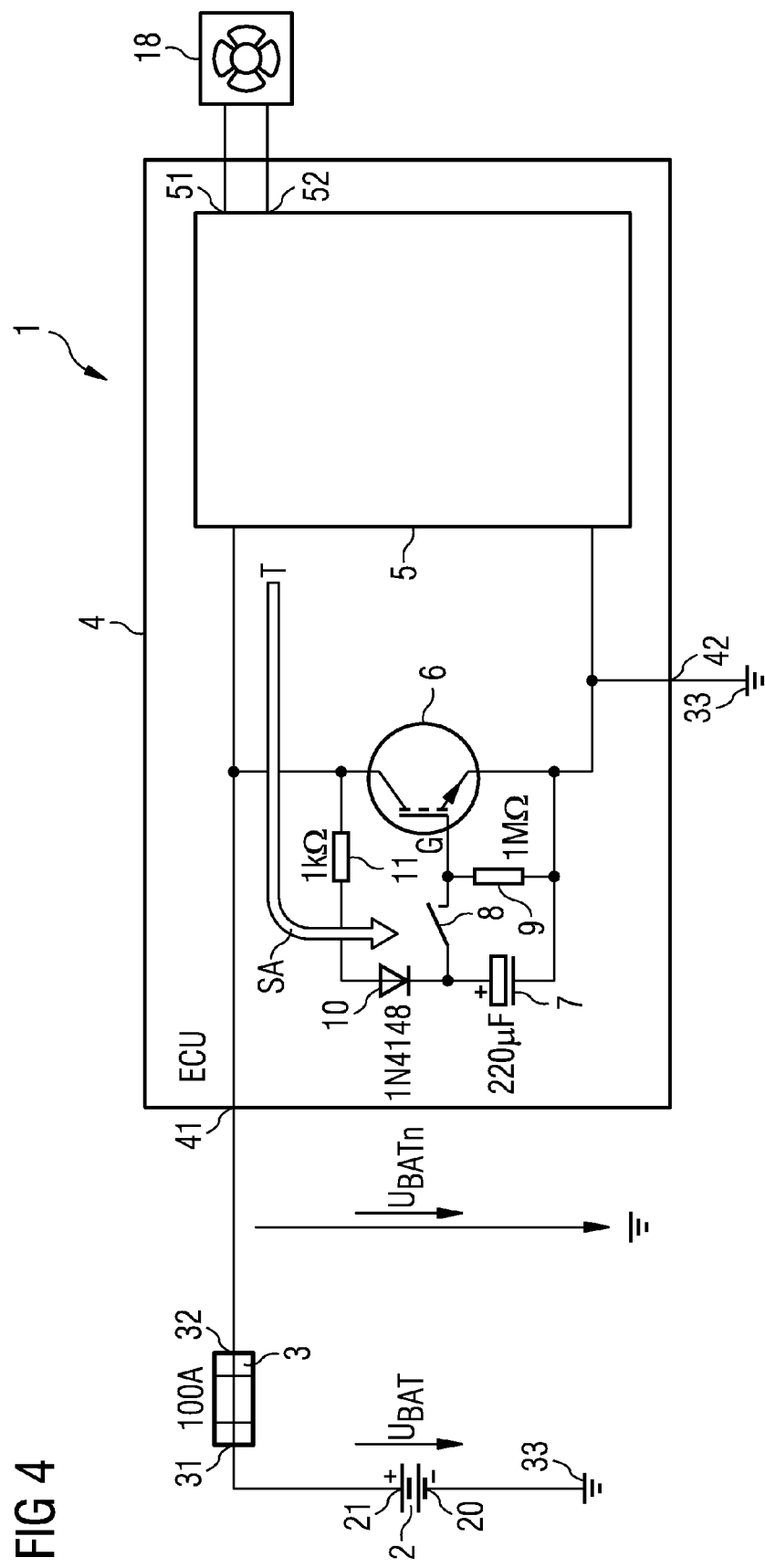
FIG. 4 shows a basic circuit diagram of fuse disconnection by means of a short-circuit switch in a control unit according to another embodiment with an IGBT (Isolated Gate Bipolar Transistor) as the clamping circuit transistor.

FIG. 4 shows a basic circuit diagram of fuse disconnection by means of a short-circuit switch in a control unit according to another embodiment with an IGBT (Isolated Gate Bipolar Transistor) as the clamping circuit transistor. Such a transistor is particularly suitable for hybrid vehicles, the battery voltages of which are approximately 400 V.

Figure 5:
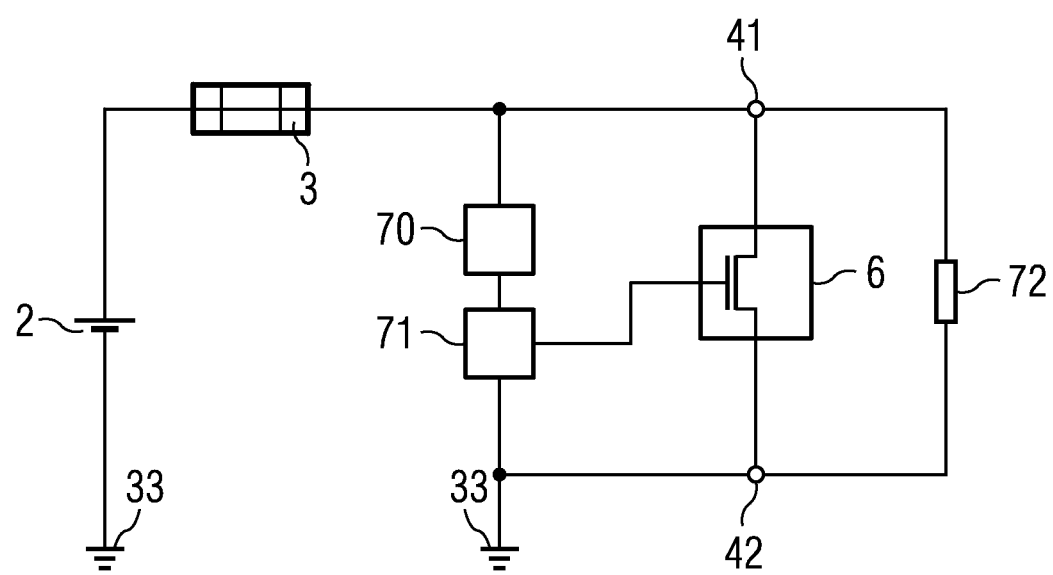
FIG. 5 shows an embodiment of a vehicle voltage supply.

FIG. 5 shows a vehicle voltage supply with a vehicle battery 2, two voltage supply connections 41 and 42 for a load 72 and a fuse 3 in a path between the vehicle battery 2 and the voltage supply connection 41. The vehicle voltage supply additionally contains a clamping circuit transistor 6 which can be switched to produce a current path between voltage supply connections 41 and 42 of the load in order to activate the fuse. An energy store 71 is set up to store the energy needed to control the clamping circuit transistor when producing the current path. A charging circuit 70 is used to charge the energy store at least during the time in which the clamping circuit transistor does not produce a current path.

Although the implementations for structural features and/or method steps have been described in specific language, the claims are not necessarily restricted to the specific features or steps described. Instead, the specific features and steps are disclosed as illustrative forms for implementing the subject matter described in the disclosure.

The invention claimed is:

1. A vehicle voltage supply comprising:
   a vehicle battery;
   two voltage supply connections for a load;
   a fuse in a path between the vehicle battery and one of the voltage supply connections of the load;
   a switchable clamping circuit transistor configured to produce a current path between the voltage supply connections of the load to activate the fuse;
   an energy store for storing the energy needed to drive the switchable clamping circuit transistor when producing the current path; and
   a charging circuit for charging the energy store at least while the switchable clamping circuit transistor does not produce the current path.

2. The vehicle voltage supply of claim 1, wherein the switchable clamping circuit transistor is driven, when producing the current path, based on a temperature detected by a temperature sensor.

3. The vehicle voltage supply of claim 2, wherein the switchable clamping circuit transistor is driven to produce the current path if the temperature exceeds a predetermined value.

4. The vehicle voltage supply of claim 1, wherein the switchable clamping circuit transistor is driven to produce the current path if the functionality of the load is not ensured.

5. The vehicle voltage supply of claim 4, wherein the switchable clamping circuit transistor is driven to produce the current path if a potential inside a predetermined range is applied to a control connection of a transistor of the load.

6. The vehicle voltage supply of claim 1, wherein the switchable clamping circuit transistor is driven to produce the current path if an amount of current consumed by the load or an amount of power consumed by the load exceeds a predetermined value or is outside a predetermined range.

7. The vehicle voltage supply of claim 1, wherein the switchable clamping circuit transistor comprises a field effect transistor.

8. The vehicle voltage supply of claim 1, wherein the energy store comprises a supercapacitor.

9. The vehicle voltage supply of claim 1, wherein the switchable clamping circuit transistor is further configured to produce the current path in response to being triggered by an actively driven electrical signal.

10. The vehicle voltage supply of claim 1, wherein the charging circuit includes a series circuit comprising a resistor and a diode.

11. The vehicle voltage supply of claim 10, wherein the series circuit is coupled to one of the voltage supply connections.

12. The vehicle voltage supply of claim 1, further comprising: a bias circuit for driving the potential of the control connection of the switchable clamping circuit transistor when the switchable clamping circuit transistor does not produce the current path.

13. The vehicle voltage supply of claim 1, wherein the switchable clamping circuit transistor comprises an Isolated Gate Bipolar Transistor (IGBT).

14. The vehicle voltage supply of claim 1, further comprising: a diode, wherein the diode inversely connected with respect to a load path of the switchable clamping circuit transistor.

15. The vehicle voltage supply of claim 1, wherein the switchable clamping circuit transistor is further driven to produce the current path if a voltage supply is connected to the voltage supply connections with reverse polarity.

16. The vehicle voltage supply of claim 1, further comprising: a housing comprising the switchable clamping circuit transistor and the load.

17. The vehicle voltage supply of claim 1, wherein the switchable clamping circuit transistor comprises a Metal Oxide Semiconductor Field Effect Transistor (MOSFET).

* * * * *